United States Patent
Fukazawa

(10) Patent No.: US 10,167,197 B2
(45) Date of Patent: Jan. 1, 2019

(54) METHOD FOR PRODUCING ZIRCONIUM TUNGSTEN PHOSPHATE

(71) Applicant: Nippon Chemical Industrial Co., Ltd., Tokyo (JP)

(72) Inventor: Junya Fukazawa, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 15/763,627

(22) PCT Filed: Oct. 4, 2016

(86) PCT No.: PCT/JP2016/079396
§ 371 (c)(1),
(2) Date: Mar. 27, 2018

(87) PCT Pub. No.: WO2017/061402
PCT Pub. Date: Apr. 13, 2017

(65) Prior Publication Data
US 2018/0265358 A1 Sep. 20, 2018

(30) Foreign Application Priority Data

Oct. 7, 2015 (JP) ................................. 2015-199000
Jun. 23, 2016 (JP) ................................. 2016-124308
Sep. 30, 2016 (JP) ................................. 2016-193026

(51) Int. Cl.
*C01B 25/45* (2006.01)
*C04B 35/447* (2006.01)
(Continued)

(52) U.S. Cl.
CPC ................ *C01B 25/45* (2013.01); *B01J 2/06* (2013.01); *C04B 14/366* (2013.01); *C09C 1/00* (2013.01);
(Continued)

(58) Field of Classification Search
CPC ...... C01B 25/45; C01B 25/372; C04B 35/447
See application file for complete search history.

(56) References Cited

U.S. PATENT DOCUMENTS 4,180,551 A * 12/1979 Clearfield ............ B01D 53/944
423/249
6,187,700 B1    2/2001 Merkel
(Continued)

FOREIGN PATENT DOCUMENTS

CN    102432292 A    5/2012
CN    102433454 A    5/2012
(Continued)

OTHER PUBLICATIONS

Shi et al. (2015) Preparation and properties of negative thermal expansion Zr2P2WO12 powders and Zr2P2WO12/TiNi composites. Materials Science and Engineering B, 203, pp. 1-6. (Year: 2015).*

(Continued)

*Primary Examiner* — Erin Snelting
(74) *Attorney, Agent, or Firm* — Westerman, Hattori, Daniels & Adrian, LLP

(57) ABSTRACT

It is intended to provide an industrially advantageous method for obtaining zirconium tungsten phosphate that is useful as a negative thermal expansion material and exhibits a single phase in X-ray diffraction. The method for producing zirconium tungsten phosphate according to the present invention comprises using a mixture of a tungsten compound and an amorphous compound containing phosphorus and zirconium as a reaction precursor and calcining the reaction precursor. Preferably, the reaction precursor has an infrared absorption peak at least at 950 to 1150 cm$^{-1}$, and the maximum value of the infrared absorption peak in this range appears at 1030 ($\pm$20) cm$^{-1}$.

15 Claims, 10 Drawing Sheets

(51) Int. Cl.
    *C04B 14/36*     (2006.01)
    *B01J 2/06*     (2006.01)
    *C09C 1/00*     (2006.01)
    *C01B 25/37*     (2006.01)

(52) U.S. Cl.
    CPC ........ *C01B 25/372* (2013.01); *C01P 2002/74* (2013.01); *C01P 2004/32* (2013.01); *C01P 2004/45* (2013.01); *C01P 2004/61* (2013.01); *C01P 2006/11* (2013.01); *C01P 2006/12* (2013.01); *C01P 2006/32* (2013.01)

(56) References Cited

U.S. PATENT DOCUMENTS

| | | | |
|---|---|---|---|
| 2001/0021292 A1* | 9/2001 | Merkel | C04B 35/01 385/37 |
| 2009/0247385 A1 | 10/2009 | Ide | |
| 2011/0160491 A1 | 6/2011 | Dubois et al. | |
| 2013/0330539 A1* | 12/2013 | Ha | C01B 25/372 428/328 |

FOREIGN PATENT DOCUMENTS

| | | | |
|---|---|---|---|
| JP | 2002-517377 A | 6/2002 | |
| JP | 2005-35840 A | 2/2005 | |
| JP | 2009-256183 A | 11/2009 | |
| JP | 2011-518111 A | 6/2011 | |
| JP | 2014-19628 A | 2/2014 | |
| JP | 2015-10006 A | 1/2015 | |
| WO | 2008/007504 A1 | 1/2008 | |

OTHER PUBLICATIONS

Tani et al. (2010). Fabrication and thermal expansion properties of $ZrW_2O_8/Zr_2WP_2O_{12}$ composites. Journal of the European Ceramic Society, 30(6), pp. 1483-1488. (Year: 2010).*

Isobe et al., "Preparation and properties of negative thermal expansion $Zr_2WP_2O_{12}$ ceramics", Materials Research Bulletin 44 (2009), pp. 2045-2049.

International Search Report dated Dec. 6, 2016, issued in counterpart International Application No. PCT/JP2016/079396 (2 pages).

Notification of Reasons for Refusal dated Jun. 13, 2017, issued in counterpart Japanese application No. 2016-193026 with English translation (6 pages).

Decision to Grant a Patent dated Jul. 25, 2017, issued in counterpart Japanese application No. 2016-193026, with English translation (6 pages).

* cited by examiner

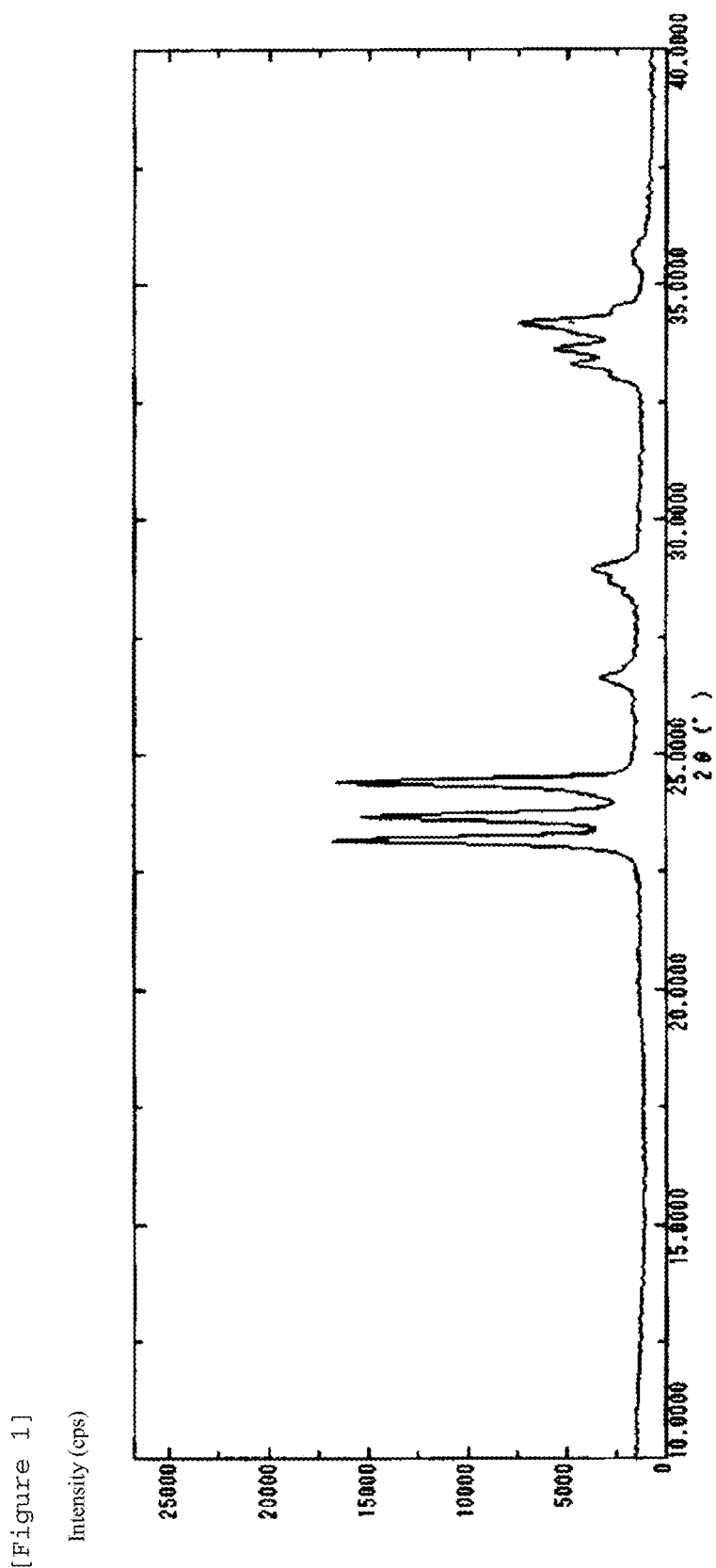
[Figure 1]

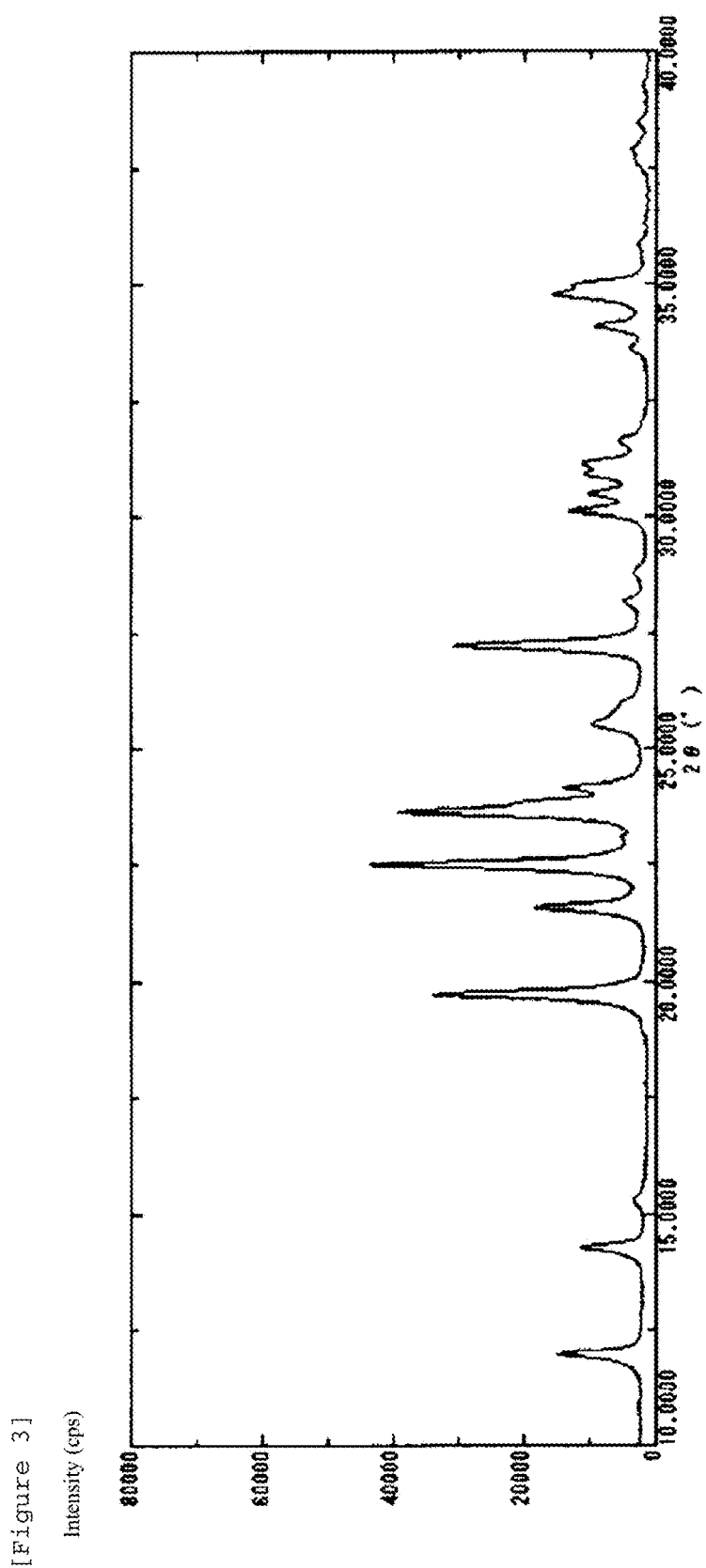
[Figure 3]

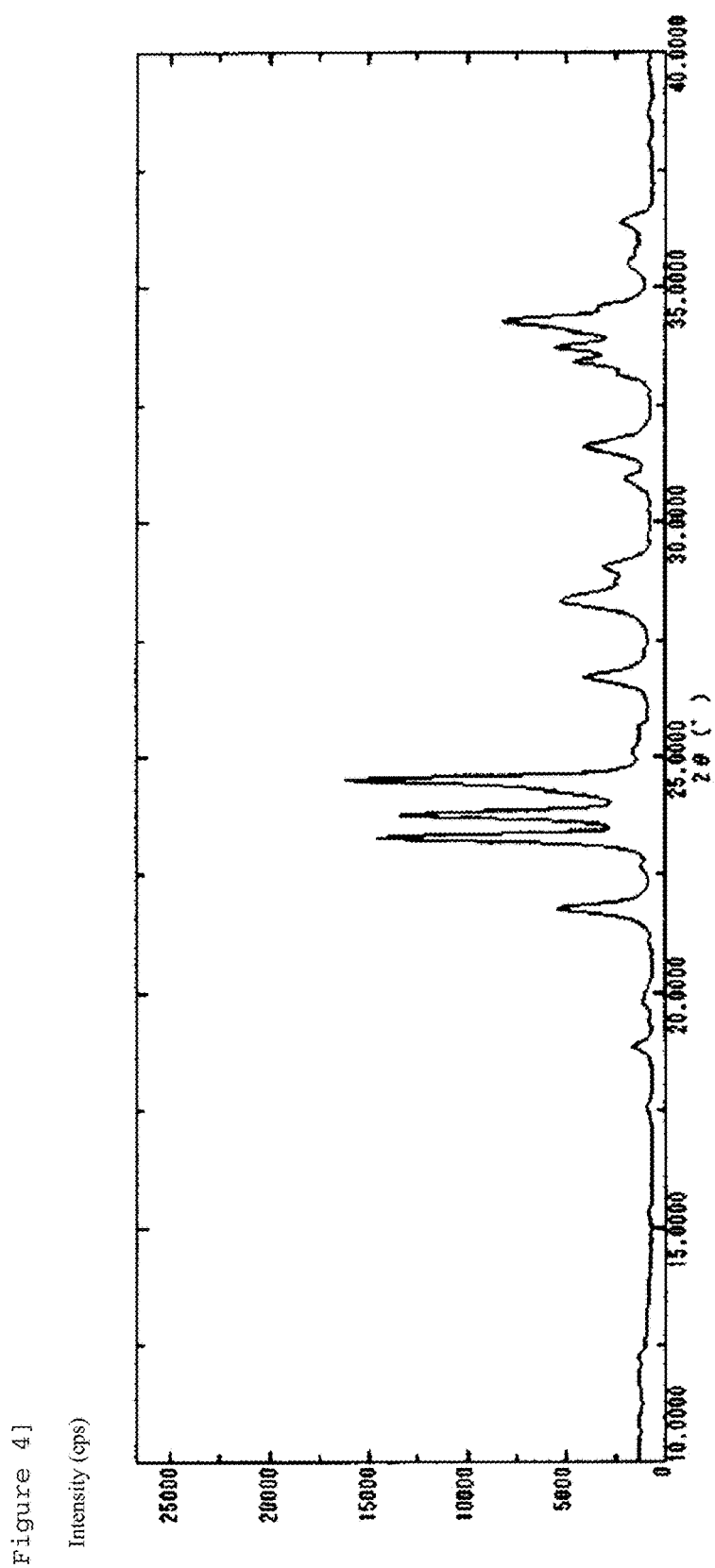
[Figure 4]

[Figure 5]
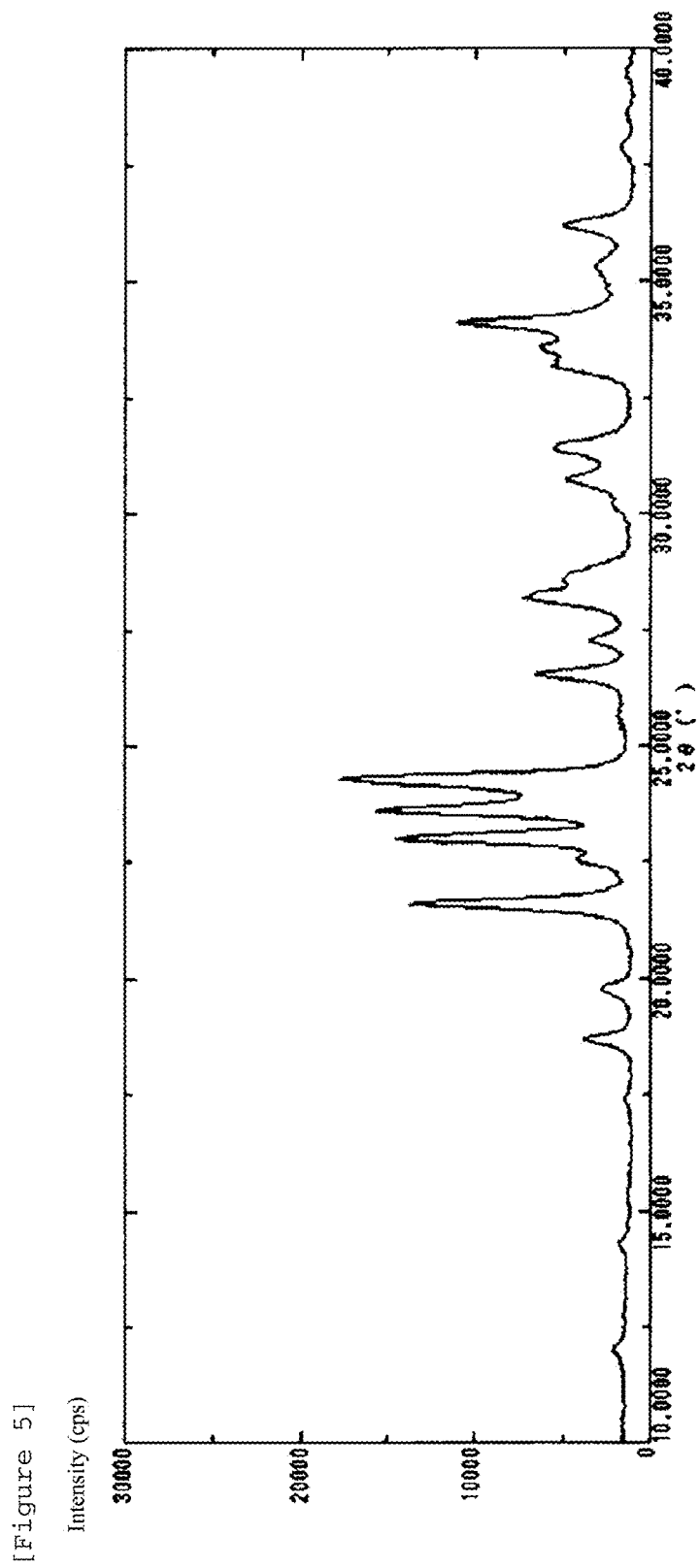

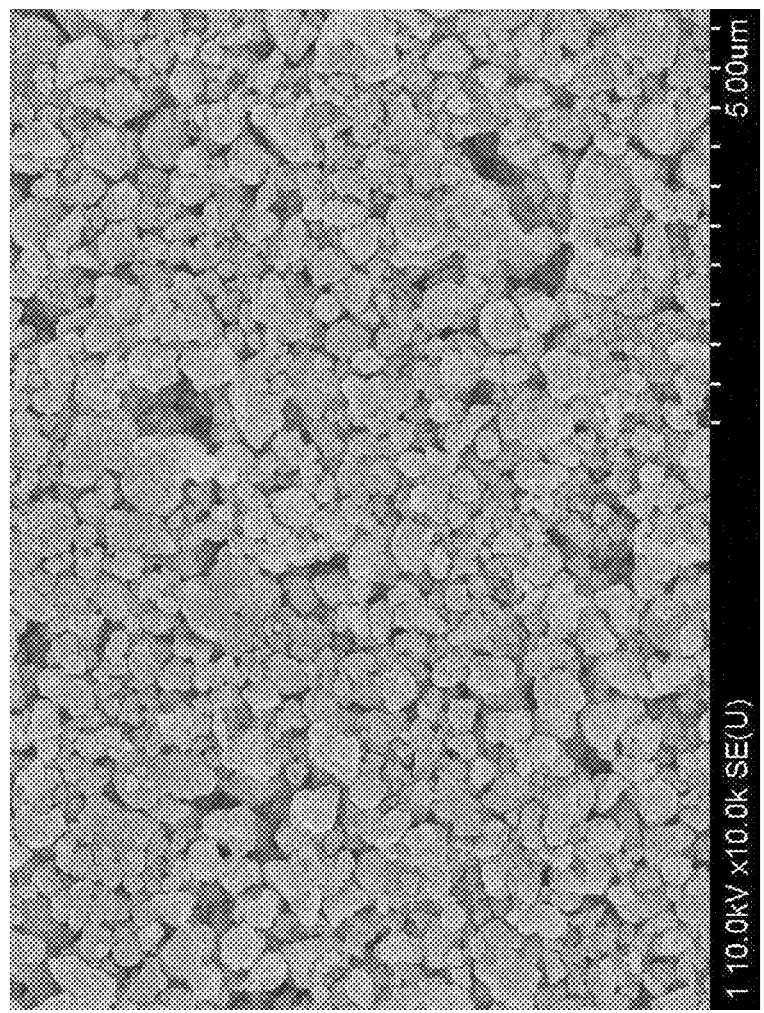
[Figure 6]

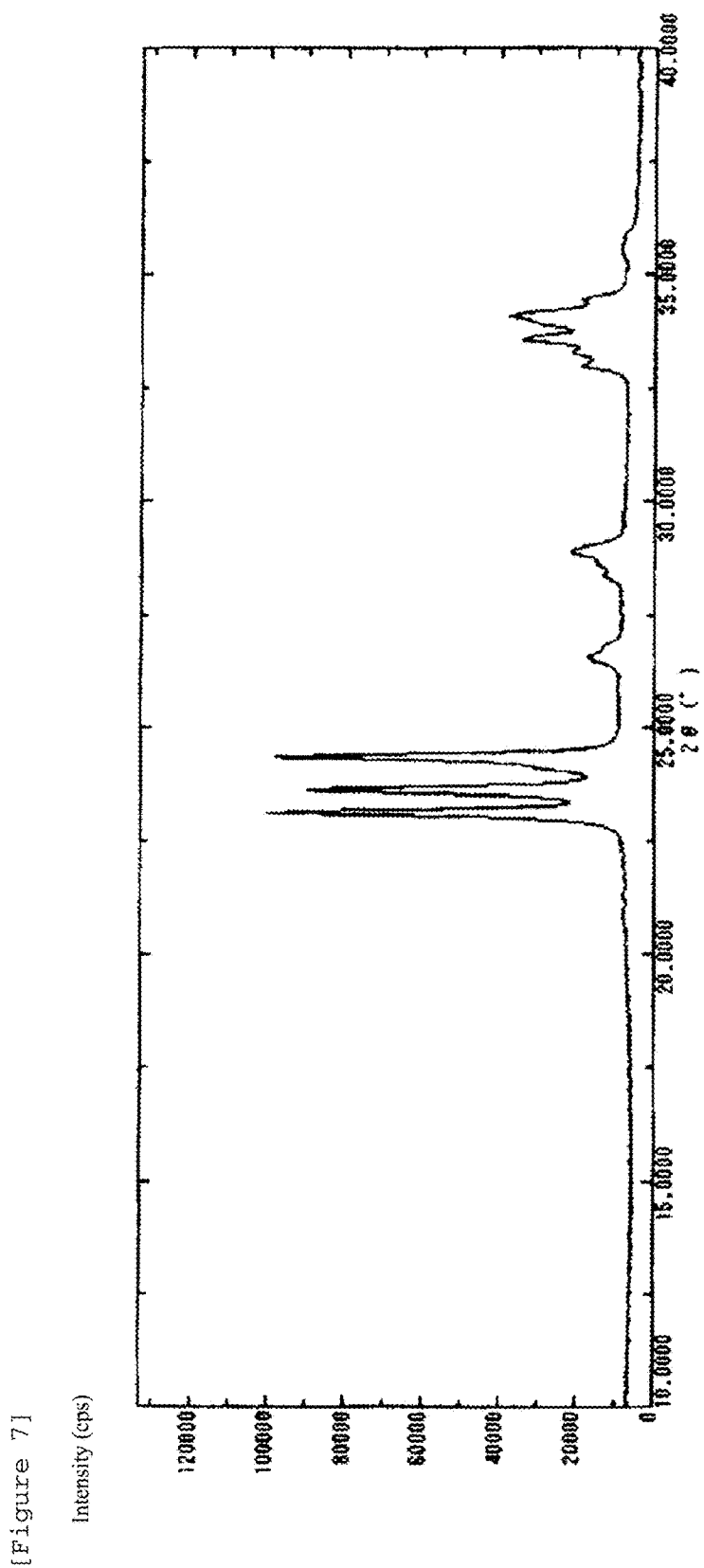
[Figure 7]

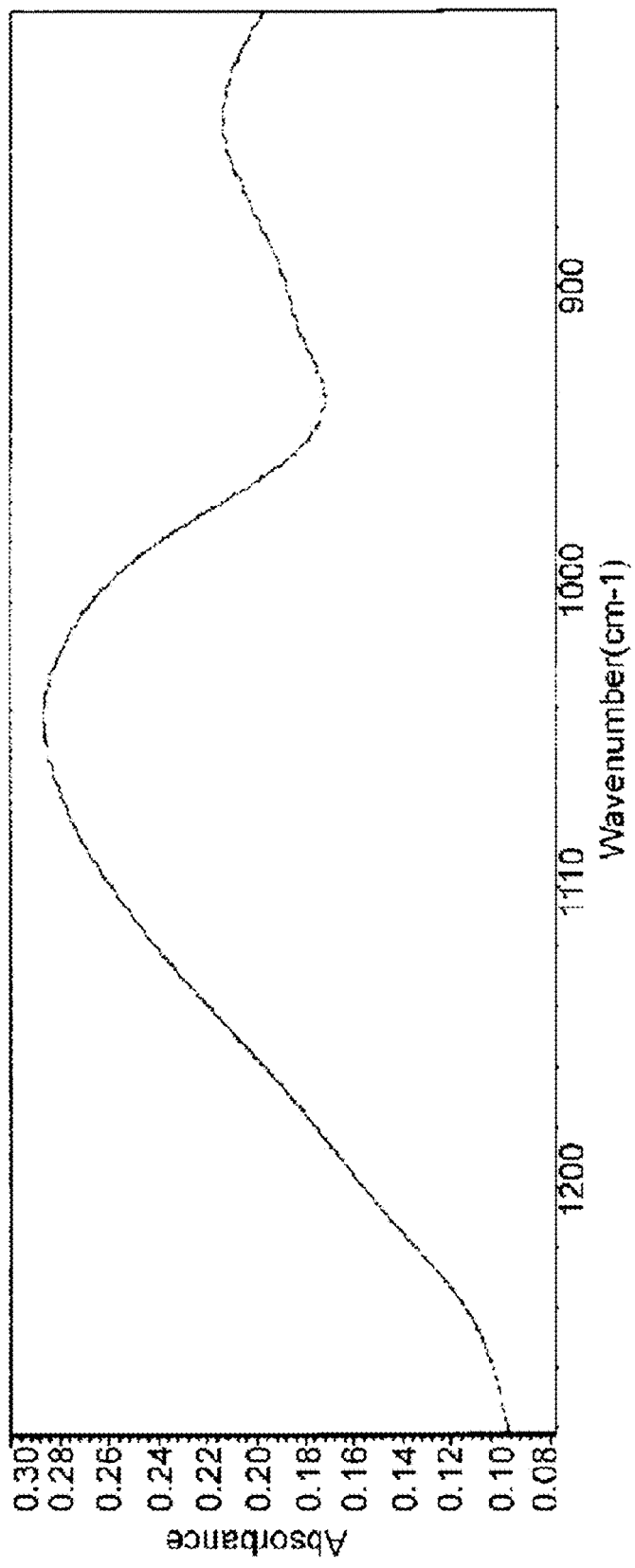
[Figure 8]

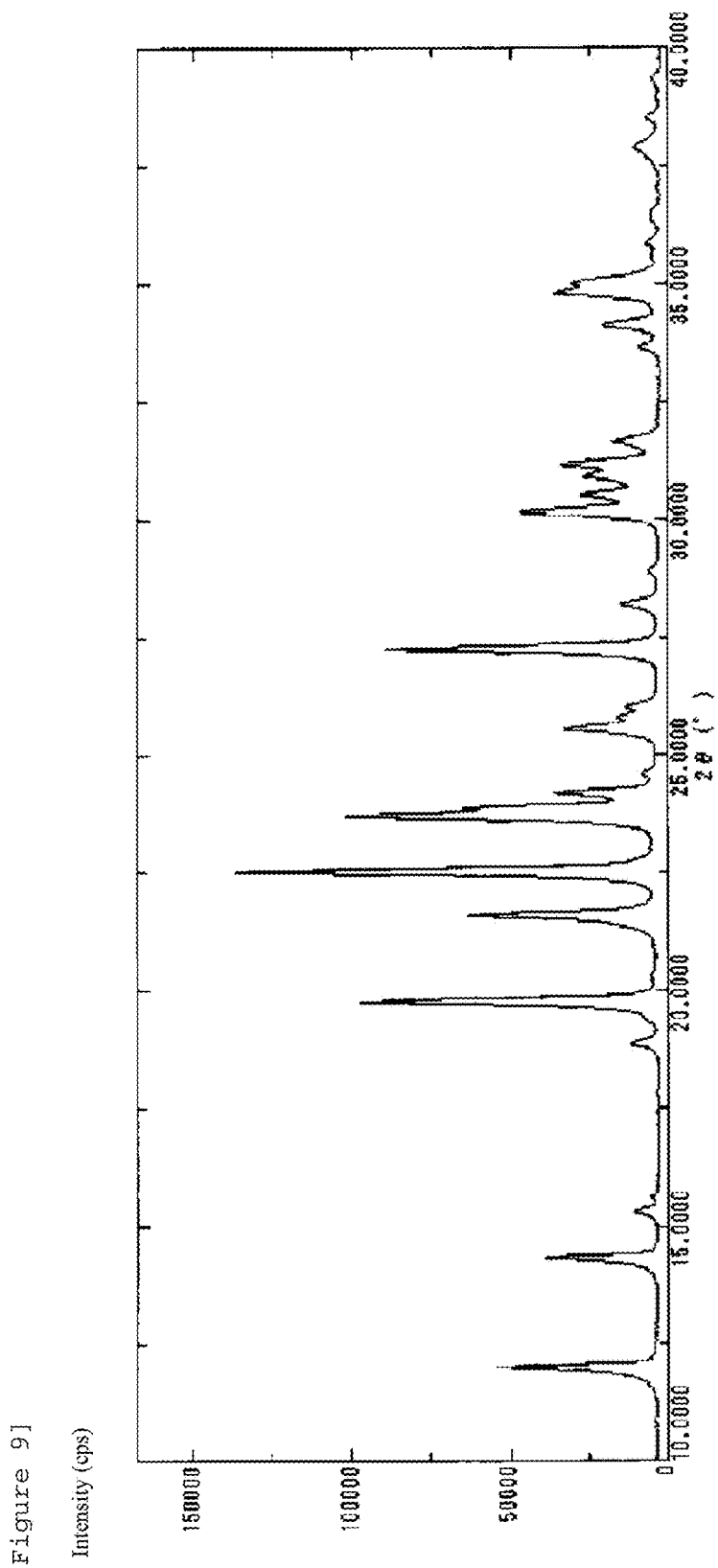
[Figure 9]

[Figure 10]
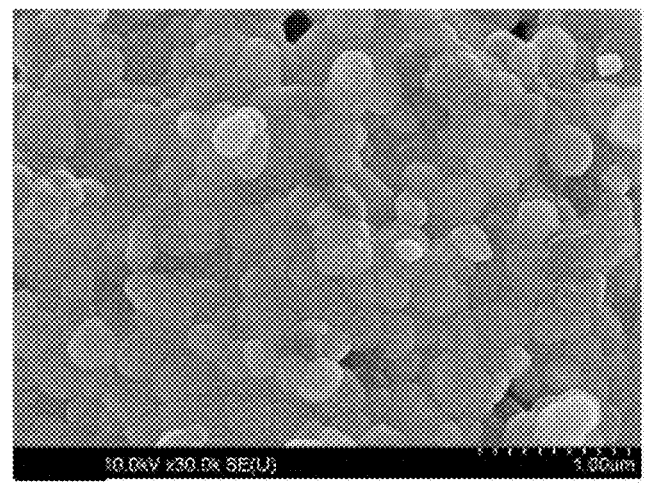
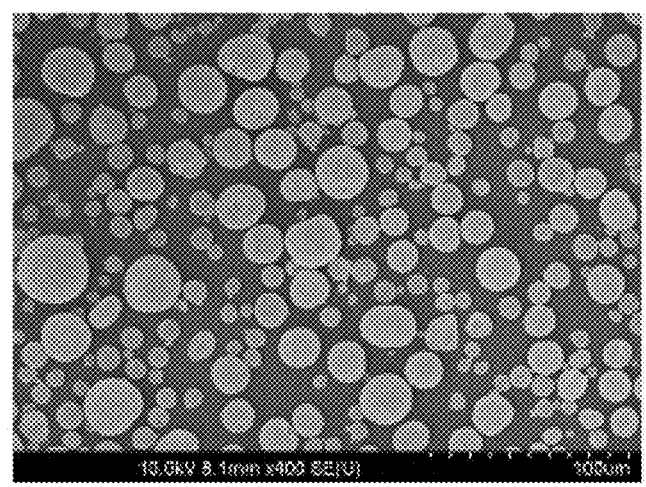

METHOD FOR PRODUCING ZIRCONIUM TUNGSTEN PHOSPHATE

TECHNICAL FIELD

The present invention relates to a method for producing zirconium tungsten phosphate useful as a negative thermal expansion material.

BACKGROUND ART

Many substances increase their lengths or volumes due to thermal expansion as the temperature elevates. By contrast, materials exhibiting negative thermal expansion (also referred to as "negative thermal expansion materials") are also known which rather decrease their volumes when warmed. It is known that the materials exhibiting negative thermal expansion can be used with other materials to suppress change in the thermal expansion of the materials caused by change in temperature.

For example, β-eucryptite, zirconium tungstate ($ZrW_2O_8$), zirconium tungsten phosphate ($Zr_2WO_4(PO_4)_2$), $Zn_xCd_{1-x}(CN)_2$, manganese nitride, and bismuth-nickel-iron oxide are known as the materials exhibiting negative thermal expansion.

The zirconium tungsten phosphate has large negative thermal expansivity with a linear expansion coefficient of −3.4 to −3.0 ppm/° C. in the temperature range of 0 to 400° C. and can be used in combination with a material exhibiting positive thermal expansion to produce a low thermal expansion material.

As for method for producing the zirconium tungsten phosphate, for example, Patent Literature 1 described below has proposed a method which comprises mixing zirconium phosphate, tungsten oxide and a reaction accelerator such as MgO in a wet ball mill, and calcining the obtained mixture at 1200° C. Patent Literature 2 described below has proposed a method which comprises wet-mixing a phosphorus source such as ammonium phosphate, a tungsten source such as ammonium tungstate and a zirconium source such as zirconium chloride, followed by calcination. Non Patent Literature 1 described below has proposed, for example, a method which comprises calcining a mixture containing zirconium oxide, tungsten oxide and ammonium dihydrogen phosphate at 1200° C.

CITATION LIST

Patent Literature

Patent Literature 1: Japanese Patent Laid-Open No. 2005-35840, claim 3, paragraph 0035.
Patent Literature 2: Japanese Patent Laid-Open No. 2015-10006, paragraphs 0023 to 0025.

Non Patent Literature

Non Patent Literature 1: Materials Research Bulletin, 44 (2009), 2045-2049.

SUMMARY OF INVENTION

Technical Problem

Zirconium tungsten phosphate serving as a negative thermal expansion material is regarded as being promising as a member for ultraprecision machining. Furthermore, there is also a demand for the development of an industrially advantageous method for obtaining zirconium tungsten phosphate.

Accordingly, an object of the present invention is to provide an industrially advantageous method for obtaining zirconium tungsten phosphate that is useful as a negative thermal expansion material and exhibits a single phase in X-ray diffraction.

Solution to Problem

The present inventors have conducted diligent studies in light of the actual situation described above and consequently completed the present invention by finding that: a mixture of a tungsten compound and an amorphous compound containing phosphorus and zirconium, obtained through the reaction of phosphoric acid with a specific zirconium compound in the presence of the tungsten compound insoluble or poorly soluble in water serves as a reaction precursor excellent in reactivity; and by use of this reaction precursor, zirconium tungsten phosphate exhibiting a single phase in X-ray diffraction is easily obtained.

Specifically, the method for producing zirconium tungsten phosphate to be provided by the present invention comprises using a mixture of a tungsten compound and an amorphous compound containing phosphorus and zirconium as a reaction precursor and calcining the reaction precursor.

Advantageous Effects of Invention

According to the present invention, zirconium tungsten phosphate that is useful as a negative thermal expansion material and exhibits a single phase in X-ray diffraction can be obtained by an industrially advantageous method.

BRIEF DESCRIPTION OF DRAWINGS

FIG. 1 is an X-ray diffraction diagram of a reaction precursor obtained in Example 1.
FIG. 2(a) is a FT-IR spectrum chart of the reaction precursor obtained in Example 1.
FIG. 2(b) is a FT-IR spectrum chart of zirconium hydroxide.
FIG. 2(c) is a FT-IR spectrum chart of phosphoric acid.
FIG. 2(d) is a FT-IR spectrum chart of tungsten trioxide.
FIG. 3 is an X-ray diffraction diagram of zirconium tungsten phosphate obtained in Example 1.
FIG. 4 is an X-ray diffraction diagram of a reaction precursor obtained in Comparative Example 1.
FIG. 5 is an X-ray diffraction diagram of zirconium tungsten phosphate obtained in Comparative Example 1.
FIG. 6 is a SEM photograph of zirconium tungsten phosphate obtained in Example 2.
FIG. 7 is an X-ray diffraction diagram of a reaction precursor obtained in Example 3.
FIG. 8 is a FT-IR spectrum chart of the reaction precursor obtained in Example 3.
FIG. 9 is an X-ray diffraction diagram of zirconium tungsten phosphate obtained in Example 3.
FIG. 10 is a SEM photograph of the zirconium tungsten phosphate obtained in Example 3. (upper); ×30000, (lower); ×400.

DESCRIPTION OF EMBODIMENTS

Hereinafter, the present invention will be described with reference to preferred embodiments thereof.

The method for producing zirconium tungsten phosphate according to the present invention comprises using a mixture of a tungsten compound and an amorphous compound containing phosphorus and zirconium as a reaction precursor and calcining the reaction precursor.

The present inventors have found that: an amorphous compound containing phosphorus and zirconium, obtained through the reaction of phosphoric acid with a zirconium compound is fine primary particles and contains a phosphorus atom and a zirconium atom at the desired molar ratio; slurry in which the tungsten compound and the amorphous compound containing phosphorus and zirconium are uniformly dispersed is obtained by this reaction in slurry containing the tungsten compound uniformly dispersed; and this slurry is subjected to drying treatment to prepare a reaction precursor that contains each starting material uniformly dispersed, contains Zr, W, and P at the desired molar ratio, and is excellent in reactivity.

Figure 2A:
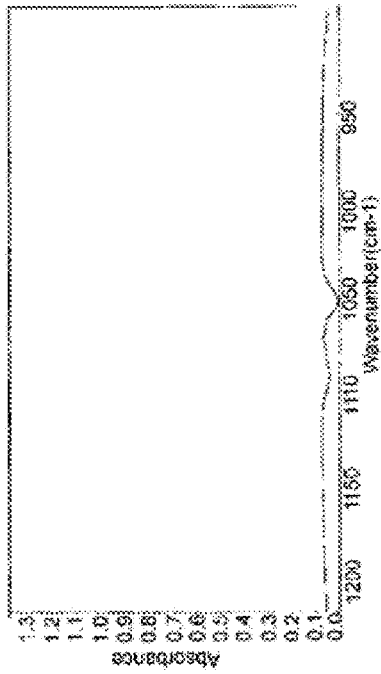
FIGS. 2(a) to 2(d) each is a FT-IR spectrum chart.
Figure 2B:
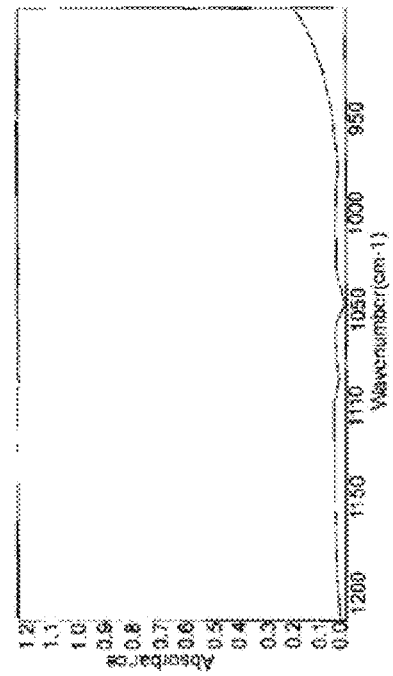
Figure 2C:
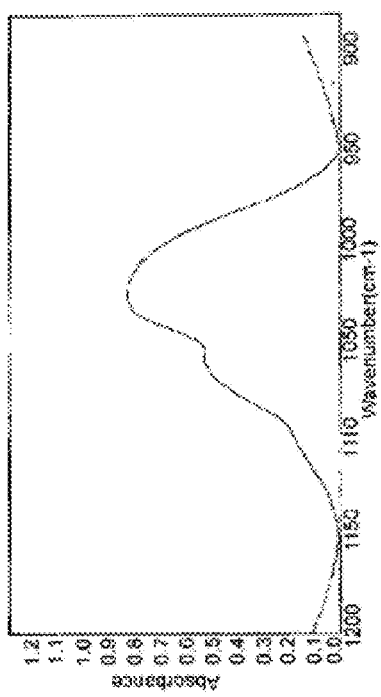
Figure 2D:
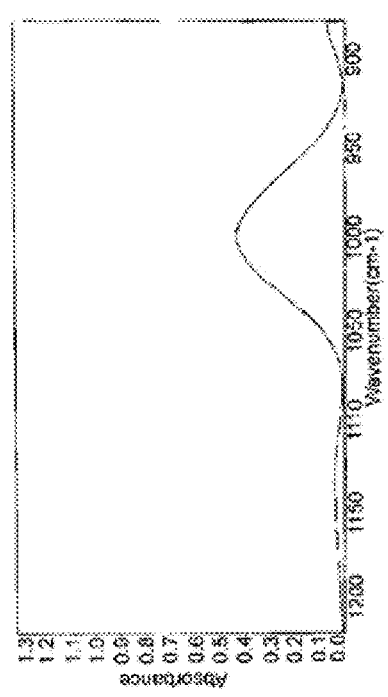

In the case of using, for example, zirconium hydroxide as the zirconium compound, only the diffraction peaks of the tungsten compound are confirmed (see FIG. 1) by the X-ray diffractometry of the resulting reaction precursor, whereas no diffraction peak of the zirconium hydroxide is observed. In the FT-IR analysis of the reaction precursor, the zirconium hydroxide and the phosphoric acid exhibit different infrared absorption peak patterns (see FIGS. 2(a) to 2(d)). It can therefore be confirmed that the zirconium hydroxide and the phosphoric acid added to the slurry are reacted.

The present inventors speculate that the amorphous compound containing phosphorus and zirconium, obtained through the reaction of phosphoric acid with a zirconium compound is amorphous zirconium phosphate.

In the present production method, preferably, the reaction precursor has an infrared absorption peak at least at 950 to 1150 $cm^{-1}$, and the maximum value of the infrared absorption peak in this range appears at 1030 (±20) $cm^{-1}$.

The molar ratio of Zr, W, and P in the reaction precursor is Zr/W=1.7 to 2.3, preferably 1.9 to 2.1, and is P/W=1.7 to 2.3, preferably 1.9 to 2.1.

In the present invention, the reaction precursor is preferably obtained by the following two methods:

(1) a method comprising step 1 of preparing slurry containing the tungsten compound, step 2 of subsequently adding phosphoric acid and a zirconium compound selected from zirconium hydroxide and zirconium carbonate to the slurry, and step 3 of subsequently drying the total amount of the resulting slurry (hereinafter, referred to as "method 1"); and (2) a method comprising step A of heat-treating slurry containing the tungsten compound, a phosphorus source and a zirconium source, step B of subsequently subjecting the slurry to wet milling treatment in a media mill, and step C of subsequently drying the total amount of the resulting slurry (hereinafter, referred to as "method 2").

<Method 1>

Hereinafter, a method for producing the reaction precursor by the method 1 will be described.

The step 1 according to the method 1 is the step of preparing slurry containing the tungsten compound uniformly dispersed in a water solvent serving as a dispersion medium.

The tungsten compound according to the step 1 is preferably a compound insoluble or poorly soluble in water. Examples thereof include tungsten compounds such as tungsten trioxide, ammonium tungstate, and tungsten chloride. Among them, tungsten trioxide is preferred from the viewpoint of the industrially easy availability of a highly pure product and easy handling.

As for the preferred physical properties of the tungsten compound that can be used, the average particle size determined by a laser diffraction/scattering method is preferably 100 μm or smaller, more preferably 0.1 to 50 μm, from the viewpoint of obtaining a reaction precursor excellent in reactivity.

The solvent for dispersing the tungsten compound according to the step 1 is not only water but may be a mixed solvent of water and a hydrophilic solvent.

The slurry concentration according to the step 1 is preferably 5 to 50% by mass, more preferably 10 to 30% by mass, from the viewpoint that the resulting slurry has a viscosity that offers easy operability and handling.

The step 1 preferably involves preparing slurry having an average particle size of solid matter of 5 μm or smaller, more preferably 2 μm or smaller, determined by a laser diffraction/scattering method, from the viewpoint of obtaining a reaction precursor excellent in reactivity.

In the step 1, a method for uniformly dispersing the tungsten compound in the water solvent can be used without particular limitations as long as the method is means that can uniformly disperse the tungsten compound in the water solvent. Since particles of the tungsten compound are particularly strongly aggregated, the method may involve adding a dispersant to the slurry. Particularly preferably, the method is performed by wet milling treatment in a media mill which performs milling and dispersion at the same time such that the average particle size of solid matter falls within the range described above, from the viewpoint of obtaining a reaction precursor having better reactivity.

The dispersant used can be properly selected according to the type of a dispersion medium. When the dispersion medium is, for example, water, any of various surfactants and polycarboxylic acid ammonium salt, etc. can be used as the dispersant. The concentration of the dispersant in the slurry is preferably 0.01 to 10% by weight, particularly, 0.1 to 5% by weight, from the viewpoint of enhancing a dispersing effect.

For example, a bead mill, a ball mill, a paint shaker, an attritor or a sand mill can be used as the media mill. Particularly, a bead mill is preferably used. In this case, operation conditions and the type and size of beads can be properly selected according to the size or throughput of the apparatus.

A dispersant may be added to the slurry from the viewpoint of more efficiently performing the treatment using the media mill. The dispersant used can be properly selected according to the type of a dispersion medium. When the dispersion medium is, for example, water, any of various surfactants and polycarboxylic acid ammonium salt, etc. can be used as the dispersant. The concentration of the dispersant in the slurry is preferably 0.01 to 10% by weight, particularly, 0.1 to 5% by weight, from the viewpoint of enhancing a dispersing effect.

The milling treatment using the media mill is preferably performed until the average particle size of solid matter determined by a laser diffraction/scattering method becomes 1 μm or smaller, more preferably 0.1 to 1 μm, from the viewpoint that a reaction precursor having better reactivity can be obtained.

In this way, slurry containing the tungsten compound uniformly dispersed in the water solvent can be prepared.

Subsequently, in the step 2, phosphoric acid and a zirconium compound selected from zirconium hydroxide and zirconium carbonate (hereinafter, also simply referred to as a "zirconium compound") are added to the slurry obtained in the step 1 to prepare a reaction precursor.

In the step 2, slurry containing a mixture of the tungsten compound and an amorphous compound containing phosphorus and zirconium is obtained through the reaction of phosphoric acid with a zirconium compound in the presence of the tungsten compound.

The phosphoric acid according to the step 2 can be used without particular limitations as long as the phosphoric acid is industrially available. The phosphoric acid can be added as an aqueous phosphoric acid solution to the slurry obtained in the step 1.

The zirconium compound according to the step 2 is zirconium hydroxide and/or zirconium carbonate.

The zirconium carbonate may be a basic salt and may be a double salt of ammonia, sodium, potassium, or the like.

The zirconium compound can be used without particular limitations as long as the zirconium compound is industrially available. The zirconium compound may be an anhydrous salt or a hydrate salt.

The zirconium compound can be added directly as a powder to the slurry obtained in the step 1. Alternatively, the zirconium compound may be added thereto as a suspension of the zirconium compound dispersed in a water solvent or a solution of the zirconium compound dissolved in a water solvent.

The amount of the phosphoric acid added to the slurry is preferably 1.7 to 2.3, more preferably 1.9 to 2.1, in terms of the molar ratio of a P element in the phosphoric acid to a W element in the tungsten compound (P/W) in the slurry, from the viewpoint of obtaining large negative thermal expansion.

The amount of the zirconium compound added to the slurry is preferably 1.7 to 2.3, more preferably 1.9 to 2.1, in terms of the molar ratio of a Zr element in the zirconium compound to a W element in the tungsten compound (Zr/W) in the slurry, from the viewpoint of obtaining large negative thermal expansion.

The blending ratio between the tungsten compound and the phosphoric acid to be added to the slurry is preferably 1.7 to 2.3, more preferably 1.9 to 2.1, in terms of the molar ratio of a P element in the phosphoric acid to a W element in the tungsten compound (P/W), from the viewpoint of obtaining large negative thermal expansion.

As for conditions for the reaction between the phosphoric acid and the zirconium compound in the slurry, the reaction temperature is preferably 5 to 100° C., more preferably 10 to 50° C., from the viewpoint that the resulting slurry has a viscosity that offers easy operability and handling.

The reaction time in the step 2 is not critical in the present production method, and the reaction can be performed for a sufficient time until the amorphous compound containing phosphorus and zirconium is formed. In many cases, slurry with satisfactory physical properties in which the tungsten compound and the amorphous compound containing phosphorus and zirconium are uniformly dispersed can be formed by the reaction for 0.5 hours or longer, preferably 1 to 4 hours.

After the completion of the reaction, the slurry after the step 2 is subjected to the step 3 without solid-liquid separation. In the step 3, the total amount of the slurry can be dried to obtain a reaction precursor for use in the present invention by the method 1. A method for drying the total amount of the slurry is not particularly limited. The drying treatment is preferably performed by spray drying from the viewpoint of more easily obtaining zirconium tungsten phosphate exhibiting a single phase in powder X-ray diffraction, because granules densely packed with the starting material particles are obtained.

In the spray drying method, the slurry is atomized by predetermined means, and the resulting fine liquid droplets are dried to obtain a reaction precursor. The atomization of the slurry includes, for example, a method using a rotating disk and a method using a pressure nozzle. In the step 3, any of the methods can be used.

In the spray drying method, the size of the liquid droplets obtained by the atomization is not particularly limited and is preferably 1 to 40 µm, particularly preferably 5 to 30 µm. The amount of the slurry supplied to a spray drying apparatus is desirably determined in consideration of this viewpoint.

The hot air temperature of the spray drying apparatus is preferably adjusted to 100 to 270° C., more preferably 150 to 230° C., because of preventing the moisture absorption of a powder and facilitating the recovery of the powder.

<Method 2>

Hereinafter, a method for producing the reaction precursor by the method 2 will be described.

The step A according to the method 2 is the step of heat-treating slurry containing a zirconium compound selected from zirconium hydroxide and zirconium carbonate, phosphoric acid and the tungsten compound.

Unless the phosphoric acid and the zirconium compound are added after preparation of slurry containing the tungsten compound uniformly dispersed in advance, the slurry tends to be highly viscous due to the tungsten compound so that the uniform mixing treatment of each starting material is difficult. The present inventors have found that, by the heat treatment of slurry containing a tungsten compound, phosphoric acid and a zirconium compound, the resulting slurry is low viscous and permits wet milling treatment in a media mill. Thus, in the method 2, the step A can yield at once slurry in which the tungsten compound and the amorphous compound containing phosphorus and zirconium are uniformly dispersed while reacting the phosphoric acid and the zirconium compound.

The same tungsten compound, phosphoric acid and zirconium compound as in the steps 1 and 2 of the method 1 can be used in the step A.

The amount of the zirconium compound added to the slurry is preferably 1.7 to 2.3, more preferably 1.9 to 2.1, in terms of the molar ratio of a Zr element in the zirconium compound to a W element in the tungsten compound (Zr/W) in the slurry, from the viewpoint of obtaining large negative thermal expansion.

The amount of the phosphoric acid added to the slurry is preferably 1.7 to 2.3, more preferably 1.9 to 2.1, in terms of the molar ratio of a P element in the phosphoric acid to a W element in the tungsten compound (P/W) in the slurry, from the viewpoint of obtaining large negative thermal expansion.

The solvent for dispersing the tungsten compound, the phosphoric acid and the zirconium compound according to the step A is not only water but may be a mixed solvent of water and a hydrophilic solvent.

The slurry concentration according to the step A is preferably 5 to 50% by mass, more preferably 10 to 30% by mass, from the viewpoint that the resulting slurry has a viscosity that offers easy operability and handling.

In the step A, the order of addition of each starting material is not particularly limited and is preferably determined in consideration of a reaction apparatus, etc. It is preferred to prepare slurry containing the tungsten compound and then add the phosphoric acid and the zirconium compound to the slurry, from the viewpoint of easier operability.

The heat treatment temperature of the slurry in the step A is preferably 40 to 110° C., more preferably 60 to 90° C., from the viewpoint that the resulting slurry has a viscosity that offers easy operability and handling, while the phosphoric acid and the zirconium compound are reacted.

The heat treatment time in the step A is not critical in the present production method, and the reaction can be performed for a sufficient time until the amorphous compound containing phosphorus and zirconium is formed and the slurry viscosity is moderately decreased. In many cases, low viscous slurry with satisfactory physical properties in which the tungsten compound and the amorphous compound containing phosphorus and zirconium are uniformly dispersed can be formed by the reaction for 0.5 hours or longer, preferably 1 to 4 hours.

Subsequently, in the step B, the slurry obtained in the step A is subjected to wet milling treatment in a media mill.

The step B is the step of subjecting the slurry after the step A to wet milling treatment in a media mill to obtain slurry containing each starting material dispersed finely and uniformly.

For example, a bead mill, a ball mill, a paint shaker, an attritor or a sand mill can be used as the media mill. Particularly, a bead mill is preferably used. In this case, operation conditions and the type and size of beads can be properly selected according to the size or throughput of the apparatus.

A dispersant may be added to the slurry from the viewpoint of more efficiently performing the treatment using the media mill. The dispersant used can be properly selected according to the type of a dispersion medium. When the dispersion medium is, for example, water, any of various surfactants and polycarboxylic acid ammonium salt, etc. can be used as the dispersant. The concentration of the dispersant in the slurry is preferably 0.01 to 10% by weight, particularly, 0.1 to 5% by weight, from the viewpoint of enhancing a dispersing effect.

The milling treatment using the media mill is preferably performed until the average particle size of solid matter determined by a laser diffraction/scattering method becomes 2 μm or smaller, more preferably 1 μm or smaller, particularly preferably 0.1 to 0.5 μm, from the viewpoint that a reaction precursor having better reactivity can be obtained.

In this way, low viscous slurry in which the fine tungsten compound and the amorphous compound containing phosphorus and zirconium are uniformly dispersed can be prepared.

After the completion of the reaction, the slurry after the step B is subjected to the step C without solid-liquid separation. In the step C, the total amount of the slurry can be dried to obtain a reaction precursor for use in the present invention by the method 2. A method for drying the total amount of the slurry is not particularly limited. The drying treatment is preferably performed by spray drying from the viewpoint of more easily obtaining zirconium tungsten phosphate exhibiting a single phase in X-ray diffraction, because granules densely packed with the starting material particles are obtained.

In the spray drying method, the slurry is atomized by predetermined means, and the resulting fine liquid droplets are dried to obtain a reaction precursor. The atomization of the slurry includes, for example, a method using a rotating disk and a method using a pressure nozzle. In the step C, any of the methods can be used.

In the spray drying method, the size of the liquid droplets obtained by the atomization is not particularly limited and is preferably 1 to 40 μm, particularly preferably 5 to 30 μm. The amount of the slurry supplied to a spray drying apparatus is desirably determined in consideration of this viewpoint.

The hot air temperature of the spray drying apparatus is preferably adjusted to 100 to 270° C., more preferably 150 to 230° C., because of preventing the moisture absorption of a powder and facilitating the recovery of the powder.

In the present production method, the reaction precursor obtained by the method 1 or 2 can contain a calcination aid component.

Examples of the calcination aid component include an element selected from Mg, Zn, Cu, Fe, Cr, Mn, Ni, V, Li, Al, B, Na, K, F, Cl, Br, I, Ca, Sr, Ba, Ti, Hf, Nb, Ta, Y, Yb, Si, S, Mo, Co, Bi, Te, Pb, Ag, Cd, In, Sn, Sb, Te, Ga, Ge, La, Ce, Nd, Sm, Eu, Tb, Dy and Ho. These calcination aid components can be used singly or in combinations of two or more. Among them, an element selected from Mg and/or V is preferred.

In the method 1, the calcination aid component is preferably added as a compound containing the calcination aid component to the slurry before the step 2 to the step 3.

In the method 2, a compound containing the calcination aid component is preferably added to the slurry before the step A to the step B, specifically, at at least one timing among before the start of the step A, in the course of the step A, after the completion of the step A, before the start of the step B, and in the course of the step B.

Examples of the compound containing the calcination aid component include an oxide, a hydroxide, a carbonate, an organic acid salt, an ammonium salt, a nitrate, a phosphate, a sulfate, a chloride, a bromide and an iodide containing the calcination aid component. Among them, an oxide or a hydroxide containing the calcination aid component is preferably used from the viewpoint of easily controlling the purity of a product and easily obtaining a highly pure product.

In the methods 1 and 2, the pH can be adjusted, if necessary, with an alkali or an acid such that the added compound containing the calcination aid component is dissolved or deposited in the slurry.

The amount of the compound containing the calcination aid component, added to the slurry is preferably 0.05 to 5.0% by mass, more preferably 0.1 to 3.0% by mass, of the calcination aid component in the resulting reaction precursor.

The calcination aid component may be contained directly as the added compound containing the calcination aid component in the reaction precursor, or the added compound containing the calcination aid component may be converted to another compound containing the calcination aid component through reaction in the slurry and contained as the compound in the reaction precursor.

In the case of using, for example, a hydroxide as the compound containing the calcination aid component, the hydroxide may be converted to phosphate containing the calcination aid component through reaction with the phosphoric acid in the slurry and contained as the phosphate in the reaction precursor.

The compound containing the calcination aid component, contained in the reaction precursor may be crystalline or amorphous.

In the present invention, a calcination step of calcining the reaction precursor can be established to obtain the zirconium tungsten phosphate of interest.

In the calcination step, the calcination temperature for calcining the reaction precursor is 900 to 1300° C. This is because at a calcination temperature of lower than 900° C., an unreacted oxide, etc. tends to remain and to make it difficult to obtain zirconium tungsten phosphate exhibiting a single phase in X-ray diffraction, whereas at a calcination temperature of higher than 1300° C., clumps of consolidated particles tend to be generated and to make it difficult to obtain a powder.

In the present production method, zirconium tungsten phosphate exhibiting a single phase in X-ray diffraction can be obtained at a low temperature. In order to exploit this advantage, the calcination temperature is preferably set to 900 to 1100° C.

The calcination time is not critical in the present production method, and the reaction can be performed for a sufficient time until zirconium tungsten phosphate exhibiting a single phase in X-ray diffraction is formed. In many cases, zirconium tungsten phosphate having satisfactory physical properties can be formed by the reaction for 1 hour or longer, preferably 2 to 20 hours. The calcination atmosphere is not particularly limited and may be any of an inert gas atmosphere, a vacuum atmosphere, an oxidative gas atmosphere, and the atmosphere.

The calcination may be performed desired times. Alternatively, the product once calcined may be milled and subsequently recalcined, for the purpose of equalizing powder characteristics.

The calcined product can be appropriately cooled, followed by milling, crushing, classification, etc. according to the need to obtain the zirconium tungsten phosphate of interest exhibiting a single phase in X-ray diffraction.

The zirconium tungsten phosphate obtained by the present production method is zirconium tungsten phosphate that is represented by $Zr_2(WO_4)(PO_4)_2$ and exhibits a single phase in X-ray diffraction. In addition, the zirconium tungsten phosphate preferably has an average primary particle size of 5 μm or smaller, preferably 0.1 to 4 μm, and an average secondary particle size of 1 to 40 μm, preferably 4 to 30 μm, determined by scanning electron microscope observation, and a BET specific surface area of 0.1 to 20 $m^2/g$, preferably 0.1 to 10 $m^2/g$, from the viewpoint of easy handling for use of the zirconium tungsten phosphate as a filler for resins, glass, etc.

The zirconium tungsten phosphate obtained by the present production method is useful, particularly, as a negative thermal expansion material which exhibits negative thermal expansion. The linear expansion coefficient of the zirconium tungsten phosphate obtained by the present production method in the temperature range of 0 to 400° C. is −3.4 to −2.6 ppm/° C., preferably −3.4 to −2.8 ppm/° C.

The zirconium tungsten phosphate obtained by the present production method can be used as a powder or a paste. For use as the paste, the zirconium tungsten phosphate can be used in the state of a paste with a low viscous liquid resin. Alternatively, the zirconium tungsten phosphate may be used in the state of a paste containing a solvent and optionally further containing a binder, a flux material and a dispersant, etc.

The zirconium tungsten phosphate obtained by the present production method can be used as a composite material by combined use with any of various organic compounds and inorganic compounds. The organic compounds or the inorganic compounds are not particularly limited. Examples of the organic compounds can include rubbers, polyolefin, polycycloolefin, polystyrene, ABS, polyacrylate, polyphenylene sulfide, phenol resin, polyamide resin, polyimide resin, epoxy resin, silicone resin, polycarbonate resin, polyethylene resin, polypropylene resin, polyethylene terephthalate resin (PET resin) and polyvinyl chloride resin. Examples of the inorganic compounds can include silicon dioxide, graphite, sapphire, various glass materials, concrete materials, and various ceramic materials.

The composite material comprises the zirconium tungsten phosphate according to the present invention serving as a negative thermal expansion material and can therefore achieve a negative thermal expansion rate, a zero thermal expansion rate or a low thermal expansion rate depending on the blending ratio with the additional compound.

EXAMPLES

Hereinafter, the present invention will be described with reference to Examples. However, the present invention is not intended to be limited by these Examples.
<Evaluation Apparatus>
1. X-ray diffractometry: The X-ray diffractometry of zirconium tungsten phosphate and a reaction precursor employed Ultima IV from Rigaku Corp. Cu-Kα was used as a radiation source. The measurement conditions were set to a tube voltage of 40 kV, a tube current of 40 mA, and a scanning rate of 0.1°/sec.
2. Infrared absorption spectrum (FT-IR) analysis: The infrared absorption spectrum analysis of a reaction precursor employed NICOLET 6700 manufactured by Thermo Fisher Scientific Inc. The measurement was performed under conditions of a resolution of 4 $cm^{-1}$, a number of scans of 256, and a measurement wavenumber region of 400 $cm^{-1}$ to 4000 $cm^{-1}$. ATR measurement was performed, followed by ATR correction and spectrum smoothing treatment.
3. Average particle size: The average particle sizes of each starting material and solid matter in slurry were measured by the laser diffraction/scattering method using Microtrac MT3300EXII particle size analyzer (manufactured by MicrotracBEL Corp).

Example 1

15 parts by mass of commercially available tungsten trioxide ($WO_3$; average particle size: 1.2 μm) were placed in a beaker. 84 parts by weight of pure water were further added to the beaker. 1 part by weight of polycarboxylic acid ammonium salt was added thereto as a dispersant.

The mixture was stirred at room temperature (25° C.) for 120 minutes using a three-one motor stirrer to prepare slurry containing 15% by mass of the tungsten trioxide. The average particle size of solid matter in the slurry was 1.2 μm.

Subsequently, to this slurry, zirconium hydroxide and an aqueous solution containing 85% by mass of phosphoric acid were added at room temperature (25° C.) so as to attain a Zr:W:P molar ratio of 2.00:1.00:2.00 in the slurry. The reaction was performed with stirring for 2 hours.

After the completion of the reaction, the total amount of the slurry was dried at 200° C. for 24 hours in the atmosphere to obtain a reaction precursor. As a result of conducting X-ray diffraction on the obtained reaction precursor, only the diffraction peaks of the tungsten trioxide were observed (see FIG. 1). As a result of conducting FT-IR analysis, the reaction precursor had an infrared absorption peak at 950 to 1150 $cm^{-1}$, and the maximum value of the infrared absorption peak in this region appeared at 1027 $cm^{-1}$ (see FIGS. 2(a) to 2(d)).

Subsequently, the obtained reaction precursor was subjected to calcination reaction at 950° C. for 2 hours in the atmosphere to obtain a white calcined product.

As a result of subjecting the obtained calcined product to X-ray diffractometry, the calcined product was single-phase $Zr_2(WO_4)(PO_4)_2$ (see FIG. 3).

Example 2

15 parts by mass of commercially available tungsten trioxide ($WO_3$; average particle size: 25 μm) were weighed and placed in a tank. 84 parts by weight of pure water and 1 part by weight of polycarboxylic acid ammonium salt as a dispersant were added to the tank.

Subsequently, the slurry was supplied with stirring to a media stirring-type bead mill equipped with zirconia beads having a diameter of 0.5 mm, and wet-milled by mixing for 15 minutes. The average particle size of solid matter in the slurry thus wet-milled was 0.3 μm.

Subsequently, to this slurry, zirconium hydroxide and an aqueous solution containing 85% by mass of phosphoric acid were added at room temperature (25° C.) so as to attain a Zr:W:P molar ratio of 2.00:1.00:2.00 in the slurry. The reaction was performed with stirring for 2 hours.

After the completion of the reaction, the slurry was supplied at a supply rate of 2.4 L/h to a spray dryer set to 220° C. to obtain a reaction precursor. As a result of conducting X-ray diffraction on the obtained reaction precursor, only the diffraction peaks of the tungsten trioxide were observed. As a result of conducting FT-IR analysis, the reaction precursor had an infrared absorption peak at 950 to 1150 $cm^{-1}$, and the maximum value of the infrared absorption peak in this region appeared at 1030 $cm^{-1}$.

Subsequently, the obtained reaction precursor was subjected to calcination reaction at 950° C. for 2 hours in the atmosphere to obtain a white calcined product.

As a result of subjecting the obtained calcined product to X-ray diffractometry, the calcined product was single-phase $Zr_2(WO_4)(PO_4)_2$.

Comparative Example 1

7 parts by mass of commercially available tungsten trioxide ($WO_3$; average particle size: 25 μm) and commercially available zirconium oxide ($ZrO_2$; average particle size: 6.5 μm) were weighed and placed at a W:Zr molar ratio of 2.00:1.00 in a tank. 84 parts by weight of pure water and 1 part by weight of polycarboxylic acid ammonium salt as a dispersant were added to the tank to prepare slurry having a solid concentration of 15%.

Subsequently, the slurry was supplied with stirring to a media stirring-type bead mill equipped with zirconia beads having a diameter of 0.5 mm, and wet-milled by mixing for 15 minutes. The average particle size of solid matter in the slurry thus wet-milled was 0.3 μm.

Subsequently, to this slurry, an aqueous solution containing 85% by mass of phosphoric acid was added so as to attain a Zr:W:P molar ratio of 2.00:1.00:2.00 in the slurry, and the mixture was stirred at room temperature (25° C.) for 2 hours.

After the completion of the reaction, the total amount of the slurry was dried at 200° C. for 24 hours in the atmosphere to obtain a reaction precursor. As a result of conducting X-ray diffraction on the obtained reaction precursor, the diffraction peaks of the tungsten trioxide and the zirconium oxide were observed (see FIG. 4).

Subsequently, the obtained reaction precursor was subjected to calcination reaction at 950° C. for 2 hours in the atmosphere to obtain a green-white calcined product.

As a result of subjecting the obtained calcined product to X-ray diffractometry, the calcined product was rich in different phases and only slightly famed $Zr_2(WO_4)(PO_4)_2$ (see FIG. 5).

<Physical Property Evaluation>

The average primary particle size, the average secondary particle size, the BET specific surface area, and the thermal expansion coefficient were measured for the zirconium tungsten phosphate obtained in each of Examples 1 and 2 and Comparative Example 1. The results are shown in Table 1. The SEM photograph of the zirconium tungsten phosphate obtained in Example 2 is shown in FIG. 6.

(Evaluation of Average Primary Particle Size)

The average primary particle size of the zirconium tungsten phosphate was determined from an average value of 50 or more particles arbitrarily extracted with a magnification of ×5000 in scanning electron microscope observation.

(Evaluation of Average Secondary Particle Size)

The average secondary particle size of the zirconium tungsten phosphate was determined from an average value of 50 or more particles arbitrarily extracted with a magnification of ×400 in scanning electron microscope observation.

(Evaluation of Linear Expansion Coefficient)

In an XRD apparatus (Rigaku Corp., Ultima IV) equipped with a heating function, lattice constants for the a, b, and c axes of a sample were measured 10 minutes after the temperature reached the target at a heating rate of 20° C./min. The lattice constants were linearly converted to change in lattice volume (rectangular parallelepiped), and the linear expansion coefficient was determined (see J. Mat. Sci., 35 (2000) 2451-2454).

TABLE 1

| | Average primary particle size (μm) | Average secondary particle size (μm) | BET specific surface area ($m^2/g$) | Linear expansion coefficient (/° C.) |
|---|---|---|---|---|
| Example 1 | 0.6 | — | 2.9 | $-3 \times 10^{-6}$ |
| Example 2 | 0.5 | 17 | 3.3 | $-3 \times 10^{-6}$ |
| Comparative Example 1 | — | — | 2.1 | — |

Note:
"—" in the table denotes not measured.

Example 3

15 parts by mass of commercially available tungsten trioxide ($WO_3$; average particle size: 1.2 μm) were placed in a beaker. 84 parts by weight of pure water were further added to the beaker.

The mixture was stirred at room temperature (25° C.) for 120 minutes to prepare slurry containing 15% by mass of the tungsten trioxide. The average particle size of solid matter in the slurry was 1.2 μm.

Subsequently, to this slurry, zirconium hydroxide, an aqueous solution containing 85% by mass of phosphoric acid, and magnesium hydroxide were added at room temperature (25° C.) so as to attain a Zr:W:P:Mg molar ratio of 2.00:1.00:2.00:0.1 in the slurry. Then, the mixture was heated to 80° C., and the reaction was performed with stirring for 4 hours.

After the completion of the reaction, 1 part by weight of polycarboxylic acid ammonium salt was added thereto as a dispersant. The slurry was supplied with stirring to a media stirring-type bead mill equipped with zirconia beads having a diameter of 0.5 mm, and wet-milled by mixing for 15 minutes. The average particle size of solid matter in the slurry thus wet-milled was 0.3 µm.

Subsequently, the slurry was supplied at a supply rate of 2.4 L/h to a spray dryer set to 220° C. to obtain a reaction precursor. As a result of conducting X-ray diffraction on the obtained reaction precursor, only the diffraction peaks of the tungsten trioxide were observed (see FIG. 7). As a result of conducting FT-IR analysis, the reaction precursor had an infrared absorption peak at 950 to 1150 cm$^{-1}$, and the maximum value of the infrared absorption peak in this region appeared at 1042 cm$^{-1}$ (see FIG. 8).

The calcination aid component Mg is presumed to exist as amorphous magnesium phosphate in the reaction precursor through the reaction between the phosphoric acid and the magnesium hydroxide in the slurry.

Subsequently, the obtained reaction precursor was subjected to calcination reaction at 1050° C. for 2 hours in the atmosphere to obtain a white calcined product.

As a result of subjecting the obtained calcined product to X-ray diffractometry, the calcined product was single-phase $Zr_2(WO_4)(PO_4)_2$ (see FIG. 9).

Example 4

15 parts by mass of commercially available tungsten trioxide ($WO_3$; average particle size: 1.2 µm) were placed in a beaker. 84 parts by weight of pure water were further added to the beaker. 1 part by weight of polycarboxylic acid ammonium salt was added thereto as a dispersant.

The mixture was stirred at room temperature (25° C.) for 120 minutes to prepare slurry containing 15% by mass of the tungsten trioxide. The average particle size of solid matter in the slurry was 1.2 µm.

Subsequently, to this slurry, zirconium hydroxide, an aqueous solution containing 85% by mass of phosphoric acid, magnesium hydroxide, and divanadium pentoxide were added at room temperature (25° C.) so as to attain a Zr:W:P:Mg:V molar ratio of 2.00:1.00:2.00:0.1:0.05 in the slurry. Then, the mixture was heated to 80° C., and the reaction was performed with stirring for 4 hours.

After the completion of the reaction, the slurry was supplied with stirring to a media stirring-type bead mill equipped with zirconia beads having a diameter of 0.5 mm, and wet-milled by mixing for 15 minutes. The average particle size of solid matter in the slurry thus wet-milled was 0.3 µm.

Subsequently, the slurry was supplied at a supply rate of 2.4 L/h to a spray dryer set to 220° C. to obtain a reaction precursor. As a result of conducting X-ray diffraction on the obtained reaction precursor, only the diffraction peaks of the tungsten trioxide were observed. As a result of conducting FT-IR analysis, the reaction precursor had an infrared absorption peak at 950 to 1150 cm$^{-1}$, and the maximum value of the infrared absorption peak in this region appeared at 1030 cm$^{-1}$.

The calcination aid component Mg is presumed to exist as amorphous magnesium phosphate in the reaction precursor through the reaction between the phosphoric acid and the magnesium hydroxide in the slurry. On the other hand, the calcination aid component V was equal to or less than the detection limit in the X-ray diffraction and therefore exhibited no detectable diffraction peak, but is presumed to exist as divanadium pentoxide in the reaction precursor.

Subsequently, the obtained reaction precursor was subjected to calcination reaction at 1050° C. for 2 hours in the atmosphere to obtain a white calcined product.

As a result of subjecting the obtained calcined product to X-ray diffractometry, the calcined product was single-phase $Zr_2(WO_4)(PO_4)_2$.

Example 5

15 parts by mass of commercially available tungsten trioxide ($WO_3$; average particle size: 1.2 µm) were placed in a beaker. 84 parts by weight of pure water were further added to the beaker.

The mixture was stirred at room temperature (25° C.) for 120 minutes to prepare slurry containing 15% by mass of the tungsten trioxide. The average particle size of solid matter in the slurry was 1.2 µm.

Subsequently, to this slurry, zirconium hydroxide, an aqueous solution containing 85% by mass of phosphoric acid, and magnesium hydroxide were added at room temperature (25° C.) so as to attain a Zr:W:P:Mg molar ratio of 2.00:1.00:2.00:0.1 in the slurry. Then, the mixture was heated to 80° C., and the reaction was performed with stirring for 4 hours.

After the completion of the reaction, 1 part by weight of polycarboxylic acid ammonium salt was added thereto as a dispersant. The slurry was supplied with stirring to a media stirring-type bead mill equipped with zirconia beads having a diameter of 0.5 mm, and wet-milled by mixing for 15 minutes. The average particle size of solid matter in the slurry thus wet-milled was 0.3 µm.

Subsequently, the slurry was supplied at a supply rate of 2.4 L/h to a spray dryer set to 220° C. to obtain a reaction precursor. As a result of conducting X-ray diffraction on the obtained reaction precursor, only the diffraction peaks of the tungsten trioxide were observed. As a result of conducting FT-IR analysis, the reaction precursor had an infrared absorption peak at 950 to 1150 cm$^{-1}$, and the maximum value of the infrared absorption peak in this region appeared at 1030 cm$^{-1}$.

The calcination aid component Mg is presumed to exist as amorphous magnesium phosphate in the reaction precursor through the reaction between the phosphoric acid and the magnesium hydroxide in the slurry.

Subsequently, the obtained reaction precursor was subjected to calcination reaction at 960° C. for 2 hours in the atmosphere to obtain a white calcined product. This calcined product was milled in a jet milling machine to obtain a milled product.

As a result of subjecting the obtained calcined product to X-ray diffractometry, the calcined product was single-phase $Zr_2(WO_4)(PO_4)_2$.

Example 6

15 parts by mass of commercially available tungsten trioxide ($WO_3$; average particle size: 1.2 µm) were placed in a beaker. 84 parts by mass of pure water were further added to the beaker.

The mixture was stirred at room temperature (25° C.) for 120 minutes to prepare slurry containing 15% by mass of the tungsten trioxide. The average particle size of solid matter in the slurry was 1.2 µm.

Subsequently, to this slurry, zirconium hydroxide and an aqueous solution containing 85% by mass of phosphoric acid were added at room temperature (25° C.) so as to attain a Zr:W:P molar ratio of 2.00:1.00:2.00 in the slurry. Then, the mixture was heated to 80° C., and the reaction was performed with stirring for 4 hours.

After the completion of the reaction, 1 part by mass of polycarboxylic acid ammonium salt was added thereto as a dispersant. The slurry was supplied with stirring to a media stirring-type bead mill equipped with zirconia beads having a diameter of 0.5 mm, and wet-milled by mixing for 15 minutes. The average particle size of solid matter in the slurry thus wet-milled was 0.3 μm.

Subsequently, the slurry was supplied at a supply rate of 2.4 L/h to a spray dryer set to 220° C. to obtain a reaction precursor. As a result of conducting X-ray diffraction on the obtained reaction precursor, only the diffraction peaks of the tungsten trioxide were observed. As a result of conducting FT-IR analysis, the reaction precursor had an infrared absorption peak at 950 to 1150 $cm^{-1}$, and the maximum value of the infrared absorption peak in this region appeared at 1042 $cm^{-1}$.

Subsequently, the obtained reaction precursor was subjected to calcination reaction at 1220° C. over 8 hours in the atmosphere to obtain a white calcined product.

As a result of subjecting the obtained calcined product to X-ray diffractometry, the calcined product was single-phase $Zr_2(WO_4)(PO_4)_2$.

<Physical Property Evaluation>

The average primary particle size, the average secondary particle size, the BET specific surface area, and the linear expansion coefficient were measured, in the same way as in Examples 1 and 2 and Comparative Example 1, for the zirconium tungsten phosphate obtained in each of Examples 3 to 6. The results are shown in Table 2. The SEM photograph of the zirconium tungsten phosphate obtained in Example 3 is shown in FIG. 10 (upper; ×30000, lower; ×400).

TABLE 2

|  | Average primary particle size (μm) | Average secondary particle size (μm) | BET specific surface area ($m^2/g$) | Linear expansion coefficient (/° C.) |
|---|---|---|---|---|
| Example 3 | 0.3 | 16 | 0.5 | $-3 \times 10^{-6}$ |
| Example 4 | 0.6 | 16 | 0.3 | $-3 \times 10^{-6}$ |
| Example 5 | 0.2 | —[1] | 6.1 | $-3 \times 10^{-6}$ |
| Example 6 | 0.5 | 16 | 0.3 | $-3 \times 10^{-6}$ |

Note;
[1] For the average secondary particle size of Example 5, secondary particles were not clearly observed, and most of the particles were obtained as primary particles.

The invention claimed is:

1. A method for producing zirconium tungsten phosphate, comprising using a mixture of a tungsten compound and an amorphous compound containing phosphorus and zirconium as a reaction precursor and calcining the reaction precursor at 900 to 1300° C.

2. The method for producing zirconium tungsten phosphate according to claim 1, wherein the reaction precursor has an infrared absorption peak at least at 950 to 1150 $cm^{-1}$, and a maximum value of the infrared absorption peak in this range appears at 1030 (±20) $cm^{-1}$.

3. The method for producing zirconium tungsten phosphate according to claim 1, wherein the reaction precursor is obtained through step 1 of preparing slurry containing the tungsten compound, step 2 of subsequently adding phosphoric acid and a zirconium compound selected from zirconium hydroxide and zirconium carbonate to the slurry, and step 3 of subsequently drying the total amount of the slurry after the step 2.

4. The method for producing zirconium tungsten phosphate according to claim 3, wherein the step 1 comprises the step of subjecting the slurry containing the tungsten compound to wet milling treatment in a media mill.

5. The method for producing zirconium tungsten phosphate according to claim 3, wherein the step 1 involves preparing slurry having an average particle size of solid matter of 5 μm or smaller.

6. The method for producing zirconium tungsten phosphate according to claim 3, wherein the step 1 involves preparing slurry having an average particle size of solid matter of 1 μm or smaller.

7. The method for producing zirconium tungsten phosphate according to claim 3, wherein the drying of the total amount is performed by spray drying.

8. The method for producing zirconium tungsten phosphate according to claim 3, wherein a compound containing a calcination aid component is added to the slurry before the step 2 to the step 3.

9. The method for producing zirconium tungsten phosphate according to claim 8, wherein the compound containing a calcination aid component to be added is selected from an oxide and a hydroxide containing the calcination aid component.

10. The method for producing zirconium tungsten phosphate according to claim 1, wherein the reaction precursor is obtained through step A of heat-treating slurry containing a zirconium compound selected from zirconium hydroxide and zirconium carbonate, phosphoric acid and the tungsten compound, step B of subsequently subjecting the slurry after the step A to wet milling treatment in a media mill, and step C of subsequently drying the total amount of the slurry after the step B.

11. The method for producing zirconium tungsten phosphate according to claim 10, wherein the step B involves preparing slurry having an average particle size of solid matter of 2 μm or smaller.

12. The method for producing zirconium tungsten phosphate according to claim 10, wherein a compound containing a calcination aid component is added to the slurry before the step A to the step B.

13. The method for producing zirconium tungsten phosphate according to claim 1, wherein the tungsten compound is tungsten trioxide.

14. The method for producing zirconium tungsten phosphate according to claim 1, wherein the reaction precursor further contains a calcination aid component.

15. The method for producing zirconium tungsten phosphate according to claim 14, wherein the calcination aid component is one or two or more elements selected from Mg, Zn, Cu, Fe, Cr, Mn, Ni, V, Li, Al, B, Na, K, F, Cl, Br, I, Ca, Sr, Ba, Ti, Hf, Nb, Ta, Y, Yb, Si, S, Mo, Co, Bi, Te, Pb, Ag, Cd, In, Sn, Sb, Te, Ga, Ge, La, Ce, Nd, Sm, Eu, Tb, Dy and Ho.

* * * * *